Patented May 22, 1951

2,553,685

UNITED STATES PATENT OFFICE 2,553,685

ADSORPTION AND ELUTION OF STREPTOMYCIN

Marvin A. Spielman, Waukegan, and James E. Rundell, North Chicago, Ill., assignors to Abbott Laboratories, North Chicago, Ill., a corporation of Illinois No Drawing. Application February 14, 1946, Serial No. 647,652

8 Claims. (Cl. 260—210)

This invention relates to the production of antibiotic agents and includes among its objects and advantages certain improvements in purification and concentration of such products, particularly applicable to the therapeutic agent known as streptomycin.

This agent, like penicillin, is a product of the vital activities of a microorganism, in this instance predominantly the microorganism known as *Actinomyces griseus,* although other microorganisms of the same or other families may also produce it. Like penicillin, it may be secured in a crude condition in dilute solution in the presence of impurities by culturing the microorganism in conventional ways including both surface culture and the deep culture method involving aeration.

It has also been known to effect an initial separation of the therapeutic agent itself from the impurities and the solvent by causing it to be adsorbed on a suitable agent such as activated carbon or a surface-active clay. But the subsequent separation of the adsorbing agent from the therapeutic agent has presented difficulties.

Specifically, a crude streptomycin containing for example, 250 units or less per milligram is readily prepared by adsorption on carbon and elution with dilute acid such as $\frac{1}{10}$ normal methanolic hydrogen chloride followed by precipitation with ether and removal of solvent as described in Journal of Biological Chemistry, volume 160, page 340 (1945). Such a product, however, is still not suited for therapeutic use, and further purification must be achieved.

We have found that a second adsorption of the foregoing product on a surface-active clay such as fuller's earth, Lloyd's reagent, which is an aluminum silicate (see Journal of American Pharmaceutical Association, vol. 5, pages 381–390, 1916); or certain commercial activated clay preparations known as Filtrol or Super Filtrol will effectively separate the therapeutic agent from undesirable impurities. And we have found that treatment of the charged adsorbent with the aqueous solutions hereinafter disclosed is effective to elute and carry off the therapeutic agent in fairly high concentration. A special advantage of such elution is that the new solution thus produced may be effectively concentrated by simple evaporation under vacuum without injury to the streptomycin and that the final product of such evaporation is a desirable medium for the administration of the therapeutic.

The preparation of crude streptomycin and streptomycin chloride is described in Proceedings of the Society for Experimental Biology and Medicine, volume 55, page 66 et seq. (1944); Journal of the American Pharmaceutical Association, volume XXXIV, page 273 et seq.; and The Journal of Biological Chemistry, volume 160, page 337 (1945). The organism *Actinomyces griseus* is grown, for example, in a medium containing 1% glucose, 0.5% peptone; 0.3% meat extract or 1.2% corn steep liquor, and 0.5% sodium chloride, dissolved in water. The culture medium is maintained at a temperature of about 20–30° until a test shows a maximum production of streptomycin. Crude streptomycin and streptomycin chloride are then produced according to the procedures outlined in Journal of Biological Chemistry, volume 160, pages 340 and 341 (1945).

An aqueous solution of a crude streptomycin salt is first adjusted to the desired pH (a pH of 2 to 10 has been found satisfactory). The streptomycin is then adsorbed in surface-active clay by stirring the clay with the solution. The clay carrying the adsorbed streptomycin is filtered off and washed with water to remove impurities. The adsorbed streptomycin is then removed from the clay by elution with a solution of an amine salt of a weak acid. A solution of aniline sulfite is very satisfactory. Such a solution may be prepared by suspending aniline in water and passing in sulfur dioxide to produce a solution containing the equivalent of 5 to 12% of aniline sulfite. The solution probably also contains various other compounds of the reagents used, such as aniline bisulfite, $C_6H_5NH_2 \cdot SO_2$, and sulfurous acid. Examples of other amine salts which may be used are: pyridine acetate, ammonium carbonate, aniline acetate, quinoline acetate, and toluidine sulfite. The liquid used for elution should be between pH 2.0 and pH 5.0. The solution containing the eluted streptomycin salt and the amine salt of the weak acid is concentrated by distillation under reduced pressure. The amine salt of the weak acid dissociates and the amine and weak acid volatilize with the steam during the distillation, leaving a residue of purified streptomycin salt. Any salt of an amine volatile with steam and an acid similarly volatile and weak enough so that the amine salt dissociates during distillation is satisfactory.

Example I

Thirty grams of crude streptomycin having about 100 units of activity per milligram were dissolved in 2 liters of water. The pH was adjusted to 4, and 75 g. of Lloyd's reagent was added along with 10 g. of diatomaceous earth.

The mixture was stirred five minutes, filtered, and the precipitate was washed with 500 cc. of water. Elution was accomplished by stirring the solid with 250 cc., 150 cc., and 150 cc. portions of a reagent made by dissolving 10% of pyridine in water and passing in sulfur dioxide to pH 4.0 The eluate was concentrated to 10 cc. under diminished pressure at a temperature not exceeding 50° C., 50 cc. of water was added and then removed by distillation. The residue was treated with acetone by triturating with successive portions until the oily precipitate became a yellow powder. The yield was 4.5 g., and the activity 350 units per mg.

Example II

To 120 g. of crude streptomycin hydrochloride in 8 liters of water was added 300 g. of a commercial surface-active clay known as Filtrol. The mixture was stirred for 15 minutes. The solid was removed by filtration. Elution was carried out by stirring the solid successively with 700 cc., 500 cc., and 500 cc. portions of a 10% aqueous solution of aniline sulfite, filtering off each portion of liquid before adding more. The combined filtrates were concentrated by distillation under reduced pressure at a temperature not exceeding 50° C., and then triturated with successive portions of acetone until the product solidified. The yield was 9.3 g. containing 435 units per milligram.

Example III

Two hundred grams of crude streptomycin hydrochloride which assayed 112 units per milligram was dissolved in 10 liters of water to give a clear solution of pH 4.0. It was stirred for 15 minutes with 250 g. of fuller's earth and filtered with the aid of a little diatomaceous earth. Elution was carried out by treating the solid with 500 cc., then 400 cc., of 10% aqueous solution of aniline sulfite having a pH 4.0. The combined eluates were concentrated under diminished pressure at less than 50° C. When the volume reached 50 cc. an additional 100 cc. of water was added and then removed by distillation. The syrupy residue was rubbed under acetone until solidification resulted. The solid was filtered off and washed thoroughly with dry acetone. The resultant pale yellow powder weighed 11.2 g. and assay showed it to contain 440 units of activity per milligram. The streptomycin thus prepared is a mixture of sulfite and sulfate with the latter predominating.

Example IV 5000 gms. of crude streptomycin hydrochloride which assayed 55 units per milligram was dissolved in 45 gallons of water to give a clear solution at a pH of 3.2. 9000 gms. of surface-active clay known as Super Filtrol was added and the solution stirred for 1 hour. The adsorbate was filtered out and washed twice with 5 gallon portions of 10% aniline sulfite for 15 minutes. The combined eluates were concentrated in vacuum at a temperature less than 40° C. to a volume of one gallon. The concentrate was diluted with an equal volume of water and this water removed by distillation, finally obtaining a volume of one gallon. The concentrate was filtered, nine volumes of acetone was added to the filtrate and the oily precipitate was allowed to settle. The supernatant liquor was decanted. Fresh acetone was added to the oily residue and rubbing continued until a solid product was obtained. The solid was filtered out and dried in vacuum.

The resulting powder weighed 632 gms. and assayed 380 units per milligram.

Example V 10 gms. of crude streptomycin hydrochloride assaying 80 units per milligram was dissolved in 500 cc. of water. The pH was adjusted to 6.0 with sodium hydroxide solution. The streptomycin was adsorbed by stirring with 25 gms. of surface-active clay known as Super Filtrol. The adsorbate was washed with 50 cc. of water and eluted three times with 50 cc. portions of 15% ammonium carbonate solution. The eluates were combined and concentrated to dryness by distillation under reduced pressure. The residue was dissolved in 10 cc. of water, filtered, and the filtrate lyophilized. 1.5 gms. of streptomycin was obtained which assayed 210 units per milligram.

Example VI 1000 gms. crude streptomycin hydrochloride assaying 85 units per milligram was dissolved in 11 gallons of water and the pH adjusted to 6.0. The activity was adsorbed by stirring with 2500 gms. of Lloyd's reagent. The adsorbate was filtered and washed twice with 2500 cc. portions of water. The solid was eluted three times with 5 liter portions of 10% aniline sulfite solution. The combined eluates were concentrated in vacuo at 25° C. to a volume of 800 cc. The concentrate was filtered and precipitated by adding 7200 cc. of acetone. The supernatant liquid was decanted from the oily precipitate and fresh acetone added to the residue. The mixture was rubbed until solid. The solids were filtered out and dried in vacuum. 180 gms. of material was obtained which assayed 280 units per milligram.

Example VII 800 gms. of crude streptomycin hydrochloride assaying 88 units per milligram was dissolved in 20 liters of water and adsorbed on 2500 gms. of surface-active clay known as Super Filtrol. The adsorbate was washed twice with 2 liter portions of water after filtering. This solid was eluted with 10 liter portions of 10% pyridine acetate solution. The combined eluates were concentrated to 1 liter volume at reduced pressure at a temperature below 30° C. Dilute sulfuric acid was added to the concentrate to a pH of 2.0. The mixture was filtered and 2 volumes of acetone was added. Settling was permitted for several hours. The supernatant liquor was decanted and the oily residue dissolved in 250 cc. of water. The solution was filtered once more and 2 volumes of acetone added to the filtrate. The mixture was permitted to settle, the supernatant liquid was decanted. The oily residue was rubbed with acetone until solid. The solid was filtered off and dried in vacuum.

A yield of 67 gms. of streptomycin sulfate was obtained which assayed 456 units per milligram.

In this specification, the abbreviation g.= grams; cc.=cubic centimeters; C.=degree centigrade; l.=liters; mg.=milligram. A microgram is one one-thousandth of a milligram. The term "unit of streptomycin" is the quantity of material that will just inhibit growth of the standard strain of E. coli in one cc. of nutrient medium.

Without further elaboration the foregoing will so fully explain our invention that others may readily adapt the same for use under various

We claim:

1. The process of purifying a crude streptomycin preparation, which comprises: (1) adsorbing the crude streptomycin material from an aqueous medium having pH between about 2.0 and about 10.0 on a surface-active clay; (2) eluting the adsorbed antibiotic material with a solution of a salt of an amine and a weak acid at a pH between about 2.0 and about 5.0; said salt being easily dissociable into its acid and amine components which are each readily volatile in steam at temperatures as low as 50° C.; (3) separating the solution from the clay; (4) and removing the salt and reducing the water content by evaporation of the resulting solution at reduced pressure, to produce a product suitable for therapeutic administration.

2. In the method of purifying streptomycin in which crude streptomycin is adsorbed on surface-active clay, the improvement which consists in eluting the adsorbed streptomycin with an aqueous solution of a salt consisting of an ammonium base and a weak acid which are volatile in steam at temperatures as low as 50° C., and removing the salt from the resulting streptomycin solution by distilling the aqueous eluate under reduced pressure at a temperature not exceeding 50° C.

3. In the method of purifying streptomycin in which crude streptomycin is adsorbed on surface-active clay, the improvement which consists in eluting the adsorbed streptomycin with an aqueous solution of a salt of an aryl amine and a weak acid which are volatile in steam at temperatures as low as 50° C., and removing the salt from the resulting streptomycin solution by distilling the aqueous eluate under reduced pressure at a temperature not exceeding 50° C.

4. A method according to claim 2 in which the dissolved salt is aniline sulfite.

5. A method according to claim 2 in which the dissolved salt is pyridine sulfite.

6. A method according to claim 2 in which the dissolved salt is pyridine acetate.

7. A method according to claim 2 in which the dissolved salt is ammonium carbonate.

8. A method according to claim 2 in which the dissolved salt is aniline acetate.

MARVIN A. SPIELMAN.
JAMES E. RUNDELL.

REFERENCES CITED

The following references are of record in the file of this patent:

UNITED STATES PATENTS

| Number | Name | Date |
|---|---|---|
| 1,048,712 | Lloyd | Dec. 31, 1912 |
| 1,300,747 | Lloyd | Apr. 15, 1919 |
| 2,104,501 | Adams et al. | Jan. 4, 1938 |
| 2,293,954 | Tiger et al. | Aug. 25, 1942 |
| 2,443,485 | Waksman et al. | June 15, 1948 |
| 2,481,267 | Walti | Sept. 6, 1949 |

FOREIGN PATENTS

| Number | Country | Date |
|---|---|---|
| 805,092 | France | Aug. 17, 1936 |

OTHER REFERENCES

Kuehl et al.: Science, vol. 102, pp. 34 and 35 (July 13, 1945).

Aechmeister et al.: "Principles and Practice of Chromatography" (John Wiley; New York, 1941). Pages 51, 77, and 78.